US009762958B2

(12) United States Patent
Woodhead et al.

(10) Patent No.: US 9,762,958 B2
(45) Date of Patent: *Sep. 12, 2017

(54) LOCALIZATION OF CUSTOMER PREMISES EQUIPMENT IN A DIGITAL COMMUNICATION NETWORK (71) Applicant: Cisco Technology, Inc., San Jose, CA (US)

(72) Inventors: Douglas Woodhead, Suwanee, GA (US); William Woodward, Lilburn, GA (US); Howard Pinder, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,630

(22) Filed: Jul. 12, 2016

(65) Prior Publication Data

US 2017/0041664 A1 Feb. 9, 2017

Related U.S. Application Data (63) Continuation of application No. 12/941,020, filed on Nov. 5, 2010, now Pat. No. 9,420,336.

(60) Provisional application No. 61/258,584, filed on Nov. 5, 2009.

(51) Int. Cl.
H04N 7/16 (2011.01)
H04N 7/167 (2011.01)
H04N 21/4408 (2011.01)
H04N 21/266 (2011.01)
H04N 21/45 (2011.01)
H04N 21/4627 (2011.01)
H04N 21/442 (2011.01)
H04N 21/61 (2011.01)

(52) U.S. Cl.
CPC ....... H04N 21/4408 (2013.01); H04N 21/266 (2013.01); H04N 21/26606 (2013.01); H04N 21/44209 (2013.01); H04N 21/4508 (2013.01); H04N 21/4524 (2013.01); H04N 21/4627 (2013.01); H04N 21/6118 (2013.01)

(58) Field of Classification Search
CPC ............ H04N 21/4408; H04N 21/266; H04N 21/26606; H04N 21/44209; H04N 21/4524; H04N 21/4627; H04N 21/6118
USPC ..................................... 725/25, 31
See application file for complete search history.

(56) References Cited

U.S. PATENT DOCUMENTS 9,420,336 B1 * 8/2016 Woodhead ......... H04N 21/4408
2005/0190916 A1 * 9/2005 Sedacca ................. H04N 7/163
380/239
2006/0062319 A1 3/2006 Kloos
2006/0156412 A1 * 7/2006 Malvar .................... H04K 1/02
726/26

(Continued)

Primary Examiner — Kyu Chae
(74) Attorney, Agent, or Firm — Meunier Carlin & Curfman LLC (57) ABSTRACT In one embodiment, a localization beacon is inserted into a digital communication signal by a localization device. The resulting modified signal is transmitted to customer premises equipment (CPE). One or more CPE devices monitor incoming signals to detect the presence of a localization beacon. If a localization beacon having certain characteristics is not received, the one or more CPE devices are configured to disable one or more CPE features.

20 Claims, 6 Drawing Sheets (56) References Cited

U.S. PATENT DOCUMENTS

| | | |
|---|---|---|
| 2006/0277566 A1* | 12/2006 | Vince ............... H04N 21/42684 |
| | | 725/30 |
| 2007/0022469 A1 | 1/2007 | Cooper et al. |
| 2007/0033628 A1 | 2/2007 | Jung |
| 2008/0018790 A1 | 1/2008 | Wong et al. |
| 2009/0080389 A1 | 3/2009 | Messerges et al. |
| 2009/0193450 A1 | 7/2009 | Kellerman |
| 2009/0221252 A1 | 9/2009 | Cheung et al. |
| 2009/0262932 A1* | 10/2009 | Petrovic ................ G06T 1/0028 |
| | | 380/255 |
| 2011/0055577 A1 | 3/2011 | Candelore et al. |
| 2011/0099591 A1 | 4/2011 | Long et al. |

* cited by examiner

| STB State | Description |
|---|---|
| Loc_Off | Localization is not enabled. The STB will continue to monitor for the beacon, but otherwise functions normally without the localization feature. |
| Loc_Homed | Localization is enabled, and the STB knows the Beacon_ID and at least one Secret value for the localization device it should be connected to. |
| Loc_Searching | The localization process has begun, but the STB does not yet know which localization device it should be connected to. |
| Loc_Lost | Localization is enabled, but the STB has either received the wrong beacon, or no beacon, for a period of time exceeding a threshold. In this state, the STB will disallow some functionality, for example, it will not allow any services to be tuned. |

FIG. 9

LOCALIZATION OF CUSTOMER PREMISES EQUIPMENT IN A DIGITAL COMMUNICATION NETWORK

CROSS REFERENCE TO RELATED APPLICATION

This application is a continuation of U.S. application Ser. No. 12/941,020, filed Nov. 5, 2010, now U.S. Pat. No. 9,420,336, which claims priority to, and the benefit under, 35 U.S.C. §119(e) of U.S. Patent Application No. 61/258,584, filed on Nov. 5, 2009, each of which is incorporated by reference herein in its entirety.

TECHNICAL FIELD

The present disclosure relates generally to digital communications.

BACKGROUND

Subscribers of some digital communication services (e.g., cable TV, broadband Internet access, etc.) generally pay a monthly fee to receive service at a given location. This service can include one or more customer premises equipment (CPE) devices being provided to a subscriber for use with the service. Often, multiple CPE devices are provided to the subscriber at a reduced cost to permit the subscriber to receive services in, for example, multiple rooms of a house or business. Unfortunately, some of these CPE devices, whether stolen or given up for the purpose, are moved to other properties and used to receive digital communications services that are not being paid for.

Overview

In general, one aspect of the subject matter described in this specification can be embodied in a device including computer readable memory, a processor configured to generate a digital sequence comprising a localization beacon based on a unique device identifier stored in the computer readable memory, and a variable forward gain stage configured to modulate an amplitude of an original signal received at a device input based on the digital sequence and provide a resulting modified signal to a device output.

One aspect of the subject matter described in this specification can be embodied in a device including computer readable memory including data pairing the device to a specific localization device, and a processor configured to monitor an input signal for presence of a localization beacon transmitted by the specific localization device and further configured to disable one or more device features if a localization beacon corresponding to the specific localization device is not detected within a detection time period.

One aspect of the subject matter described in this specification can be embodied in a system including a localization device transmitting a localization beacon, and a CPE device configured to monitor an input for presence of a localization beacon specific to the localization device and to disable one or more features if the localization beacon specific to the localization device is not detected within a detection time period.

One aspect of the subject matter described in this specification can be embodied in methods including generating a localization beacon based on a unique device identifier stored in computer readable memory, receiving a cable television signal, introducing the localization beacon into the cable television signal to generate a modified cable television signal, and transmitting the modified cable television signal to at least one CPE device.

Particular embodiments of the subject matter described in this specification can be implemented to realize one or more of the following advantages. A generally low cost modulator can localize CPE to a home or office, deterring piracy and service theft. A secure signaling technique between a generally inexpensive device at the entry to the customer premise and the various service devices within the dwelling provides a cryptographically secure and generally inexpensive method of localizing devices to the dwelling. A slight or nonexistent increase in hardware cost for CPE is incurred.

The details of one or more embodiments of the subject matter described in this specification are set forth in the accompanying drawings and the description below. Other features, aspects, and advantages of the subject matter will become apparent from the description, the drawings, and the claims.

DESCRIPTION OF EXAMPLE EMBODIMENTS

Figure 1:
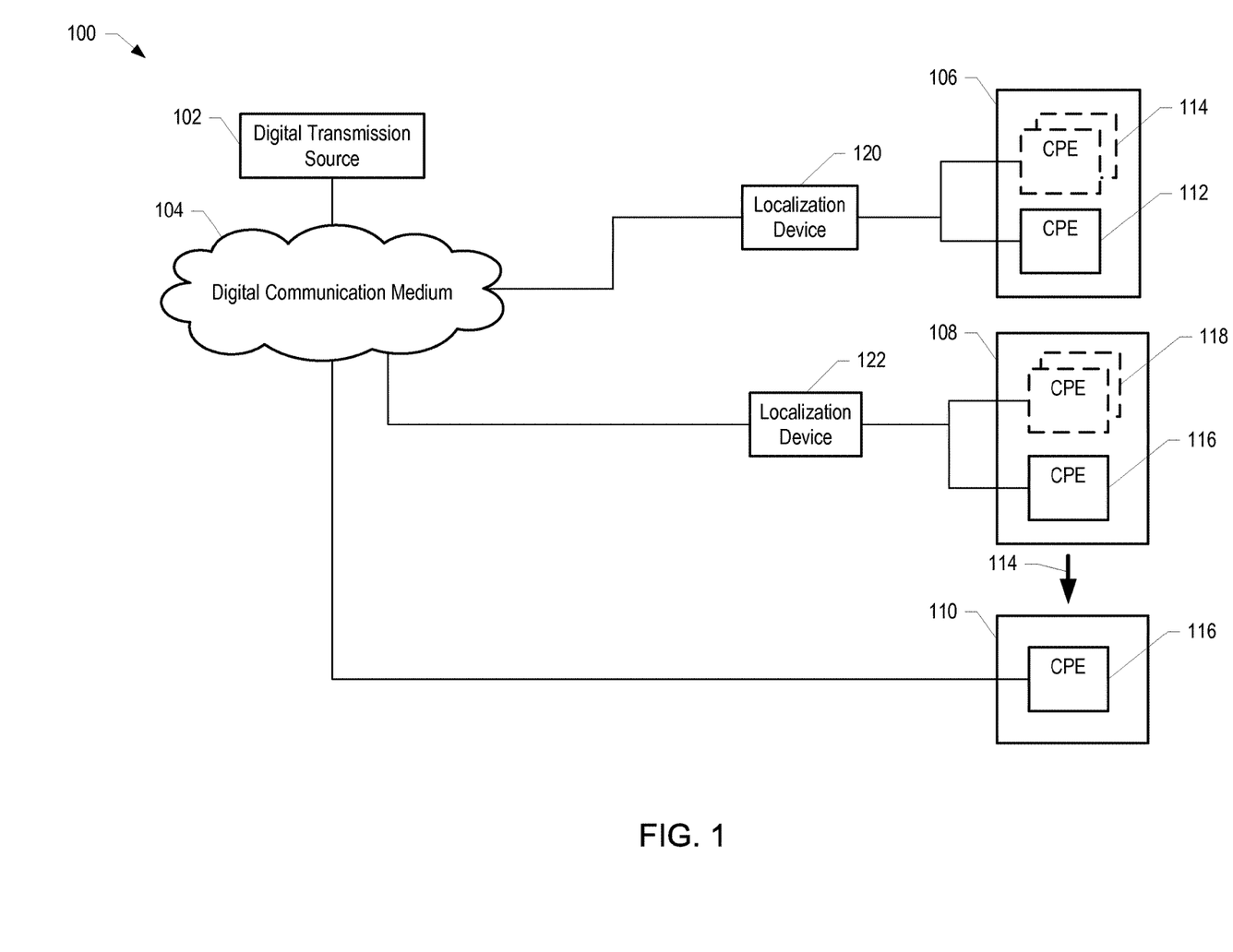
FIG. 1 illustrates an example digital network incorporating techniques for localizing customer premises equipment.

FIG. 1 illustrates an example digital network 100 incorporating techniques for localizing customer premises equipment. A digital transmission source 102 sends a signal over a digital communication medium 104 to a number of premises 106, 108, and 110. The premises 106, 108, 110 can be dwellings, business offices, other types of buildings, and/or other physical property.

The premises 106 includes customer premises equipment (CPE) 112 and can include additional CPE 114. The CPE 112 can, for example, be physically located on the premises 106. The transmission path between the digital transmission source 102 and the premises 106 includes a localization device 120. The localization device 120 can be located proximate to the premises 106. For example, the localization device 120 can be located on a utility pole near the premises 106, mounted on a structure on the premises 106, on a utility box for a buried cable, or otherwise located proximate to the premises 106. The premises 106 can be an authorized receiving location for the digital signal from the digital transmission source because, for example, the occupants of the premises 106 are the intended recipients of the signal or, for further example, the occupants of the premises 106 are subscribers to data services offered by a data services provider that controls the digital communication network 100.

The localization device 120 can be placed in a branch of the digital communication network that only serves the premises 106. The localization device 120 can modify the signal from the digital transmission source 102 before that signal reaches the premises 106. In some implementations, the localization device 120 can encrypt the signal from the digital transmission source 102 before that signal reaches the premises 106. In some implementations, the localization device 120 modulates the signal from the digital transmission source 102 using a low bit rate signal. In some implementations, the localization device 102 adds a digital beacon to the signal from the digital transmission source.

In some implementations, to successfully receive the original signal from the digital transmission source, the CPE 112 and any additional CPE 114 include instructions for decrypting the signal passed to the premises 106 by the localization device 120. The CPE 112 and any additional CPE 114 can be paired with the localization device 120. For example, the CPE 112 and any CPE 114 can include instructions for demodulating an encrypted signal encrypted by the localization device 120. The CPE 112 and any additional CPE 114 can be provided instructions for decrypting signals from the localization device 120 by a digital data provider (for example, a broadcasting service or a broadband Internet service provider). For example, the CPE 112 and any additional CPE 114 can be programmed by a digital data provider to decrypt encrypted signals specific to the localization device 120 installed proximate to the premises 106. The CPE 112 and any additional CPE 114 can be programmed with information (e.g., a decryption key and/or algorithm) that can be used to reverse changes made to the digital signal by the localization device 120.

In some implementations, the CPE 112 and any CPE 114 include instructions for performing one or more operations in response to detection or non-detection of a digital beacon from a localization device. The CPE 112 and any additional CPE 114 can be paired with the localization device 120. For example, the CPE 112 and CPE 114 can be programmed to disable one or more CPE functions if a digital beacon having certain characteristics (e.g., unique characteristics indicating that it corresponds to the localization device 120) is not detected in an incoming signal. The CPE 112 and any additional CPE 114 can become and/or remain fully functional if a digital beacon specific to the localization device 120 is detected.

The premises 108 includes CPE 116 and can include additional CPE 118. The transmission path between the digital transmission source 102 and the premises 108 includes a localization device 122. In some implementations, the localization device 122 can be similar in operation to the localization device 120, but the localization device 122 can encrypt the signal differently than the localization device 120. For example, the localization device 122 can modulate the digital signal from the digital transmission source using a low bit rate encrypting signal that is different from the encrypting signal used in the encrypting device 120. In some implementations, the localization device 122 can be similar in operation to the localization device 120, but the localization device 122 can add a different digital beacon than the digital beacon added by the localization device 120.

In some implementations, the CPE 116 and any additional CPE 118 can include instructions for decrypting the signal passed to the premises 108 by the localization device 122. In this manner, the CPE 116 and any additional CPE 118 can be paired with the localization device 122. The instructions for decrypting the signal passed to the premises 108 by the localization device 122, however, are such that these do not work for decrypting signals from the localization device 120. That is, if the CPE 116 is moved from the premises 108 to the premises 106, the CPE 116 will not function properly. If the CPE 116 is moved (as illustrated in FIG. 1 by the arrow 114) to the premises 110 which does not have a localization device between it and the digital transmission source, the CPE 116 will fail to function properly as it will attempt to decrypt the original signal from the digital transmission source 102, the result of which is a signal that is unusable by the CPE 116.

In some implementations, the CPE 116 and any additional CPE 118 include instructions for performing one or more operations in response to detection or non-detection of a digital beacon from a localization device. The CPE 116 and any additional CPE 118 can be paired with the localization device 122. For example, the CPE 116 and any additional CPE 118 can be programmed to disable one or more CPE functions if a digital beacon having certain characteristics (e.g., unique characteristics indicating that it corresponds to the localization device 122) is not detected in an incoming signal. The CPE 116 and any additional CPE 118 can be programmed by a digital communications provider to become and/or remain fully functional if a digital beacon specific to the localization device 122 is detected. If the CPE 116 is moved (as illustrated in FIG. 1 by the arrow 114) to the premises 110 which does not have a localization device between it and the digital transmission source, the CPE 116 will fail to detect any digital beacon from a localization device. In response the CPE can disable one or more features.

Figure 2:
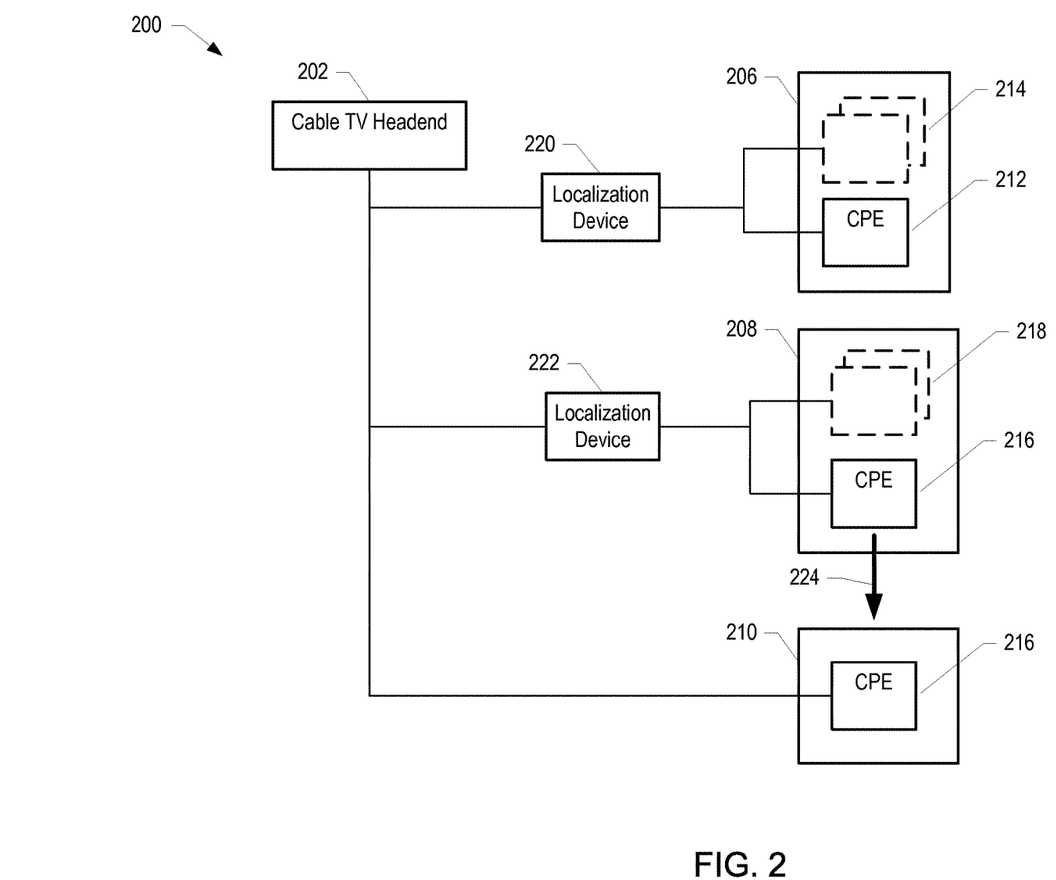
FIG. 2 illustrates an example digital cable television network incorporating techniques for localizing customer premises equipment.

FIG. 2 illustrates an example digital cable television network 200 incorporating techniques for localizing customer premises equipment. A cable television head end 202 sends a digital signal including a plurality of television channels over a digital cable network. In some implementations, the cable network also carries broadband Internet signals. The cable network can include coaxial cables, and/or fiber optic cables. The cable network includes branches that serve premises 206, 208, and 210. The premises 206, 208, 210 can be dwellings, business offices, other types of buildings, and/or other physical property.

The premises 206 includes CPE 212 and can include additional CPE 214. CPE for the cable network can include, for example, set top boxes (STB), digital video recorders (DVRs), digital terminal adapters (DTAs), cable modems (for broadband Internet access), voice over Internet protocol (VoIP) gateways, VoIP telephones, teleconferencing equipment, and any other devices used to access digital communication services. In general, a DTA is a device used to provide basic cable service to analog television tuners on cable networks that no longer transmit analog cable signals (or transitioning networks that plan to soon phase analog channels out). The premises 206 can be an authorized receiving location for the cable television signal because, for example, the occupants of the premises 206 are subscribers (e.g., paying customers) of the cable television provider.

The CPE 212 can, for example, be physically located on the premises 206. The transmission path between the cable television head end 202 and the premises 206 includes a localization device 220. The localization device 220 can be located proximate to the premises 206. For example, the localization device 220 can be located on a utility pole near the premises 206, mounted on a structure on the premises 206, on a utility box for a buried cable, or otherwise located proximate to the premises 206. In some implementations, the localization device can be located inside a building (e.g., a house) at the premises 206.

The localization device 220 can be placed in a branch of the cable television network that only serves the premises 206. The localization device 220 can modify the signal from the cable television head end 202 before that signal reaches the premises 206. In some implementations, the localization device 220 can encrypt the signal from the cable television head end 202. In some implementations, the localization device 220 modulates the signal from the cable television head end 202 using a low bit rate signal. In some implementations, the localization device 220 adds a digital beacon to the signal from the digital transmission source.

In some implementations, to successfully receive the original signal (e.g., a digital cable television signal including multiple channels and/or broadband Internet signals) from the cable television head end 202, the CPE 212 and any additional CPE 214 include instructions for decrypting an encrypted signal passed to the premises 206 by the localization device 220. The CPE 212 and any additional CPE 214 can be paired with the encrypting device 220. For example, the CPE 212 and any CPE 214 can include instructions for decrypting the encrypted signal having been encrypted by the localization device 220. The CPE 212 and any additional CPE 214 can be provided instructions for decrypting signals from the localization device 220 by the cable television provider. For example, the CPE 212 and 214 can be programmed at a cable television provider's facility before the CPE devices are sent to the subscriber. Alternatively, a cable television installer can program CPE devices at the time they are installed at the premises 206 to decrypt signals from the localization device 220. In some implementations, CPE can be configured to automatically pair itself with a localization device after installation. The CPE 212 and any additional CPE 214 can be programmed with information (e.g., a decryption key and/or algorithm) that can be used to reverse changes made to the cable television signal by the encrypting device 220.

In some implementations, the CPE 212 and any CPE 214 include instructions for performing one or more operations in response to detection or non-detection of a digital beacon from a localization device. The CPE 212 and any additional CPE 214 can be paired with the localization device 220. For example, the CPE 212 and CPE 214 can be programmed to disable one or more CPE features (e.g., a STB can disable audio/video output for one or more channels) if a digital beacon having certain characteristics (e.g., unique characteristics indicating that it corresponds to the localization device 220) is not detected in an incoming signal. The CPE 212 and any additional CPE 214 can, for example, be programmed by a cable television provider to become and/or remain fully functional if a digital beacon specific to the localization device 220 is detected.

The premises 208 includes CPE 216 and can include additional CPE 218. The transmission path between the cable television head end 202 and the premises 208 includes a localization device 222. The localization device 222 can be similar in operation to the localization device 220, but the localization device 222 can encrypt the cable television signal differently than the localization device 220. For example, the localization device 222 can modulate the digital signal from the cable television head end 202 using a low bit rate encrypting signal that is different from the encrypting signal used in the localization device 220. The CPE 216 and any additional CPE 218 can be paired with the localization device 222. In some implementations, the CPE 216 and any additional CPE 218 can include instructions for decrypting the signal passed to the premises 208 by the localization device 222. The instructions for decrypting the signal passed to the premises 208 by the localization device 222, however, are designed such that they do not work for decrypting signals from the localization device 220. That is, if the CPE 216 is moved from the premises 208 to the premises 206, the CPE 216 will not function properly.

If the CPE 216 is moved (as illustrated in FIG. 2 by the arrow 224) to the premises 210 which does not have a localization device between it and the cable television head end 202, the CPE 216 will fail to function properly as it will attempt to decrypt the original signal from the cable television provider 202, the result being a signal that is unusable by the CPE 216.

In some implementations, the CPE 216 and any additional CPE 218 include instructions for performing one or more operations in response to detection or non-detection of a digital beacon from a localization device. For example, the CPE 216 and any additional CPE 218 can be programmed to disable one or more CPE functions (e.g., set top box can disable audio/video output for one or more channels) if a digital beacon from a localization device is not detected in an incoming signal. The CPE 216 and any additional CPE 218 can be paired with the localization device 222. The CPE 216 and any additional CPE 218 can be programmed by a digital data provider to be fully functional if a digital beacon specific to the localization device 222 is detected. If the CPE 216 is moved (as illustrated in FIG. 2 by the arrow 224) to the premises 210 which does not have a localization device between it and the digital transmission source, the CPE 216 will fail to detect any digital beacon from a localization device. In response the CPE can disable one or more features.

In some implementations, CPE can be configured to disable some features while permitting others to function. For example, a television STB can be configured to disable all television channels except for some subset of local channels such as public access channels or local emergency information. In another example, an IP telephone or voice gateway can be configured to disable all outgoing calls except for emergency 911 calls.

In some implementations, the modification performed by the localization device is such that the hardware in the CPE does not need to be modified from that of CPE commonly used without a localization device. In these implementations, the hardware can be made to function with the localization device through software and/or firmware reprogramming.

In some implementations, a splitter, combiner, filter, and/or combinations of these elements can be used to permit the modification of only those frequencies on the cable television network that carry television signals. In some implementations, a splitter, combiner, filter, and/or combinations of these elements can be used to permit the modification of only those frequencies on the cable television network that carry broadband Internet signals. In some implementations, a splitter, combiner, filter, and/or combinations of these elements can be used to permit the modification of only those frequencies on the cable television network that carry one or more different services provided over the cable television network such that the modification techniques described herein can be used with one, or some, of these services without affecting others.

A device can be inserted into the cable feed going into a dwelling upstream of the various devices to be localized to that dwelling or location. This device modulates the cable feed with a low bit rate signal. In some implementations, this signal can be received by the customer premises equipment (CPE) devices without any additional hardware and a decision made regarding valid localization of the device. A secure device in the modulator is cryptographically paired with the secure element in the CPE devices to authenticate the dynamically changing messages. Valid localization is determined by continuously receiving a valid cryptographically signed message from the paired modulator.

Figure 3:
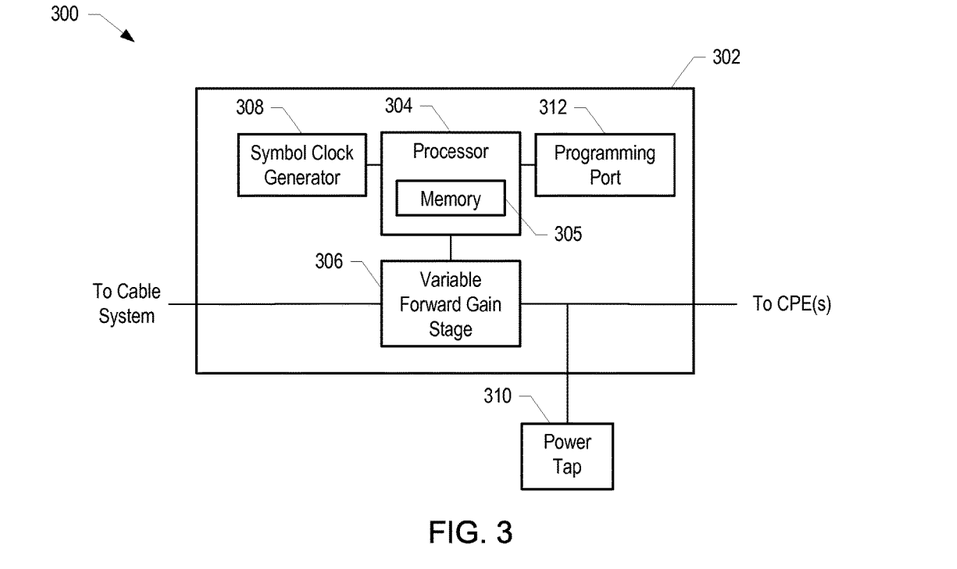
FIG. 3 is a block diagram of an example localization device.

FIG. 3 is a block diagram 300 of an example localization device 302. The localization device 302 can, for example, modulate a signal from a cable system to introduce a digital beacon into the signal and output the amplitude modulated signal for transmission to one or more CPEs. In some implementations, the cable system signal is amplitude modulated to introduce a digital beacon into the signal.

The localization device 302 can include a processor 304. One or more cryptography keys can be stored in non-volatile memory 305 of the processor 304. For example, cryptography keys can be stored in the memory 305 using a programming port 312. In some implementations, the processor 304 is a secure processor designed for use with digital cryptography such that any cryptography keys stored in the processor's memory 305 are protected from discovery. A symbol clock generator 308 provides a base timing signal to the processor 304. Output from the processor 304 can be used to control a variable forward gain stage 306. The variable forward gain stage 306 can modulate the signal from the cable system based on the output of the processor 304. For example, the signal from the processor 304 to the variable forward gain stage 306 can be a binary sequence corresponding to a localization beacon. The amplitude of the original cable signal can be shifted according to this sequence. For example, if a current bit of the binary sequence is zero, the amplitude of the original cable signal can be left unaltered, and if a current bit of the binary sequence is one, the amplitude of the original cable signal can be decreased. Power to the localization device 302 can be provided by a power tap 310. The power tap 310 can include, for example, a power supply connected to a conventional electrical outlet at the premises served by the localization device 302 that provides power to the localization device over a coaxial cable. By shifting the amplitude of the cable system signal the localization device 302 can introduce a digital beacon into the cable signal provided to the premises proximate to the location where the localization device 302 is installed. CPE installed at the premises can be configured to discontinue normal operation if the appropriate digital beacon is not detected.

In some implementations, the amplitude change introduced by the localization device 302 is less than a maximum amount that can be compensated for by an automatic gain control (AGC) stage of any connected CPE. In such implementations, CPE that do not support localization restrictions (e.g., older CPE already in service) continue to function normally even with a localization device in place. As common CPE AGC circuits are generally designed to compensate for slow changes to an incoming signal, in some implementations, bits forming the digital beacon are transmitted at a compatible rate. In some implementations, a compatible data transmission rate can lead to digital beacons having transmission times of several minutes for simpler authentication schemes to several hours for more complicated authentication schemes.

In this disclosure, a cable television set top box (STB) often serves as an example CPE device configured to receive and process a digital beacon. Such examples, however, are generally applicable to other types of CPE.

Figure 4:
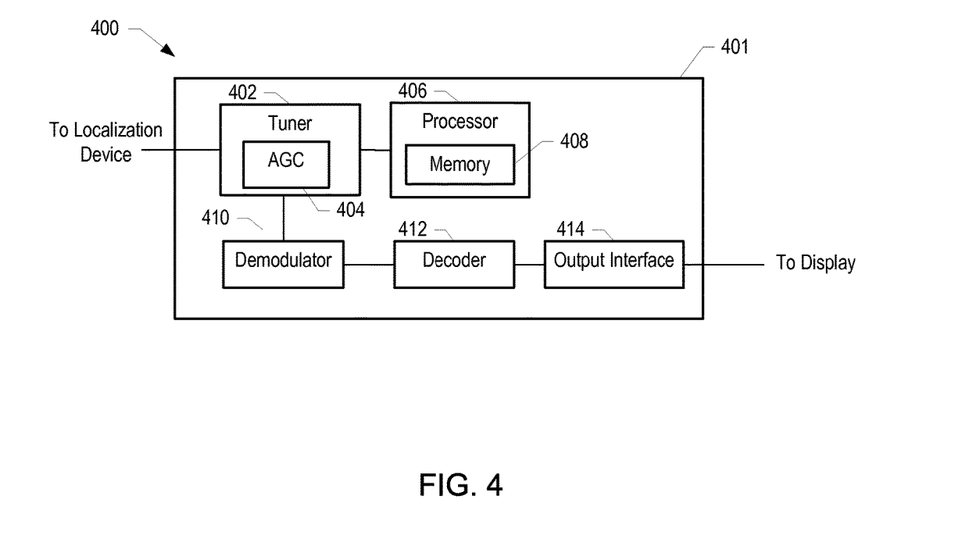
FIG. 4 is a block diagram of an example cable television set top box configured to perform operations for localizing customer premises equipment.

FIG. 4 is a block diagram 400 of an example cable television set top box configured to perform operations for localizing customer premises equipment. The example STB includes a tuner 402 with an AGC 404. A cable television signal, a quadrature amplitude modulated (QAM) digital cable signal, for example, can be received at the tuner 402. The QAM signal can include a localization beacon that has been added by a localization device. The relatively slow (as compared to the bit rate of the QAM signal) amplitude changes made by the localization device can be compensated for by the AGC 404. Feedback from the AGC 404 can be provided to the processor 406 which can use this information to detect the presence or non presence of a localization beacon. The computer readable memory 408 can include, for example, data for use in determining if a localization beacon is present and, if so, whether that beacon is valid. For example, the memory 408 can include one or more cryptographic keys that can be used in cryptographic calculations performed by the processor on feedback data received from the AGC 404.

After passing through the AGC 404, amplitude fluctuations introduced by a localization device have been removed, and a gain adjusted version of the cable television signal is provided to a demodulator 410. The demodulator can convert the QAM signal into a digital bit stream. The digital bit stream can be read by a decoder 412. The decoder can be, for example, an MPEG decoder for converting the digital bit stream into audio and video. Audio and video from the decoder 412 can be provided to an output interface 414 which can in turn pass audio and video to a display device and audio amplifier.

In some implementations, digital beacons include a unique identifier corresponding to the localization device transmitting the beacon. In some implementations, digital beacons include a cryptographically obfuscated version of a unique identifier corresponding to the localization device transmitting the beacon. Methods for obfuscation and/or authentication of beacons can include keyed hash message authentication code (HMAC), and public key cryptography such as RSA signatures and elliptic curve cryptography (ECC).

In some implementations, a localization device is configured to repeatedly transmit beacons. In some implementations, beacons include temporal content that is updated on some recurring basis. For example, beacons can include a timestamp (and/or a cryptographically obfuscated timestamp). A timestamp can be used, for example, to prevent 'replay' attacks where a copy of a previous beacon is resent in a circumvention attempt. When a localization enabled STB device is first deployed and the STB receives its first beacon, the STB securely stores the time value from a timestamp of that beacon in its non-volatile memory. When the next beacon arrives, the STB compares the time in that beacon with its stored time value, and if the newer beacon's time value is earlier than (or equal to) the STB's stored value, the beacon is ignored. But if the beacon's time is greater than the stored time, the beacon will be accepted, and the STB will overwrite its stored time value from the value in the beacon. In this manner, the STB has the time value of the last known good beacon, and will reject any earlier beacons it might receive. By knowing the time value in the beacon, and recording the actual time when the beacon arrives, the STB has a well known reference point for future comparisons. The STB can determine how much time has elapsed since a valid beacon was received, and disable services if a timeout is exceeded.

In some implementations, a localization device is configured to transmit two or more different beacons. Differences between multiple beacons can include, for example, beacons based on different unique device identifiers (e.g., a localization device can include more than one device identifier and transmit beacons based on each identifier), beacons based on different encryption and/or authentication methods, beacons including authentication certificates, beacons based on different cryptographic keys, and combinations of different unique device identifiers, encryption methods, authentication methods and cryptographic keys. The use of multiple beacons can, for example, provide a contingency option if cryptographic keys for one beacon type become compromised. The use of multiple beacons can also permit different CPE configurations. For example, set top boxes using software based encryption and/or authentication can listen for a first type of beacon, while STBs using a more secure hardware based encryption and/or authentication can use a second type of beacon.

In some implementations, a digital beacon is sent in whole or in part "in the clear" without being encrypted. In such implementations, the digital beacon and any data included therein can be validated using authentication methods. For example, a beacon can be digitally signed, so that a STB can verify that the beacon was generated by a valid localization device and not by an attacker.

In some implementations, a beacon type can include a digital certificate. For example, a localization device can transmit both a first beacon including a unique location device identifier and a second beacon including a digital certificate for verifying the authenticity of the first beacon. In some implementations, more than two beacon types can be transmitted by a location device. The more than two beacon types can include combinations of localization device data and digital certificates for authentication.

A beacon can include several forms of digital authentication, any of which can be used for verification. Multiple forms of verification can, for example, permit various different types of STBs to each verify the beacon using their own independent method. Multiple different classes of STBs can be deployed, each using an independent verification method, which isolate them from a security perspective. If one type of authentication is ever compromised, others would remain intact.

In some implementations, shared secret authentication is used. In some implementations, public key cryptography is used. In some implementations, both shared secret and public key cryptography are used. In an implementation using shared secret authentication, a localization device and a STB can each include (e.g., have stored in memory) the same secret value. For example, a localization device can use a standard HMAC and the secret to apply the authentication, and the STB can use HMAC and the same secret to verify the beacon. In some implementations, each localization device can include two or more of these secret values, some of which can be used by STBs at the time of deployment of the STB for beacon verification, and others that are reserved for later use. In some implementations, a beacon can be signed multiple times, once using each secret value in the localization device, so that both current and future STBs will be able to verify beacons from it. In some implementations, computer readable memory of STBs (and other types of CPE) can be programmed with shared secrets and/or public keys before the device is deployed.

In implementations using public key cryptography, beacons are signed using a private key, and verified using a public key. The private key remains secret, but the corresponding public key can be freely shared. A localization device can digitally sign the beacon using either RSA or ECC methods (both of these are public key cryptosystems), and the STB can verify the beacon using the localization device public key. The public key can be sent to the STB either from the localization device or from a cable television head end, using an authenticated path.

In some implementations, beacons include location content (and/or cryptographically obfuscated location content). For example, beacons can include data based on coordinates from a global positioning system (GPS) receiver included in a localization device (not shown in FIG. 3).

In some implementations where more than one type of beacon is transmitted, the transmission of differing types of beacons can be interleaved. For example, a first type of digital beacon can be partially transmitted, followed by partial or complete transmission of second type of digital beacon, followed by transmission of a later or remaining portion of the first type of digital beacon.

Figure 5:
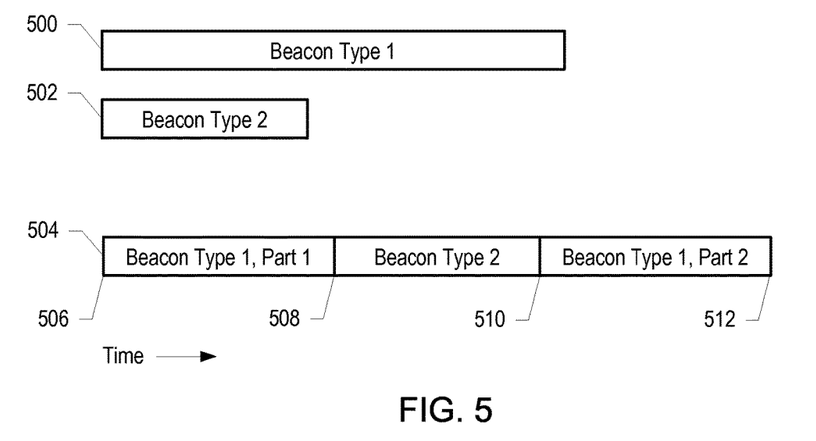
FIG. 5 illustrates an example of localization beacon interleaving.

FIG. 5 illustrates an example of localization beacon interleaving. A first example beacon 500 being of a first beacon type is shown. The width of the first beacon 500 represents its bit length. The first beacon 500 can include, for example, an RSA certificate or an ECC certificate. A second example beacon 502 is shown. The second beacon can include, for example, a unique location device identifier signed using RSA or ECC. The width of the second beacon 502 represents its bit length. The sequence 504 illustrates transmission of the first beacon 500 interleaved with the second beacon 502. At a time $T_0$ 506 the transmission of the first beacon 500 begins. At a time $T_1$ 508 the transmission of the first beacon is stopped before the entire first beacon has been transmitted and transmission of the second beacon 502 begins. At a time $T_2$ 510 the transmission of the second beacon 502 is complete and transmission of the first beacon 500 resumes until it is completed at time $T_3$ 512. The certificate included in the first beacon can, for example, be used to authenticate the the second beacon.

A localization enabled STB monitors the incoming cable signal for a digital beacon. The STB can be configured to recognize and/or decrypt the unique localization device identifier (and other content) included in a beacon and to alter STB functionality depending on whether the beacon corresponds to the localization device to which the STB is "homed". The term "homing", at it is used herein, refers to the process of pairing a STB with a given localization device.

Figure 6:
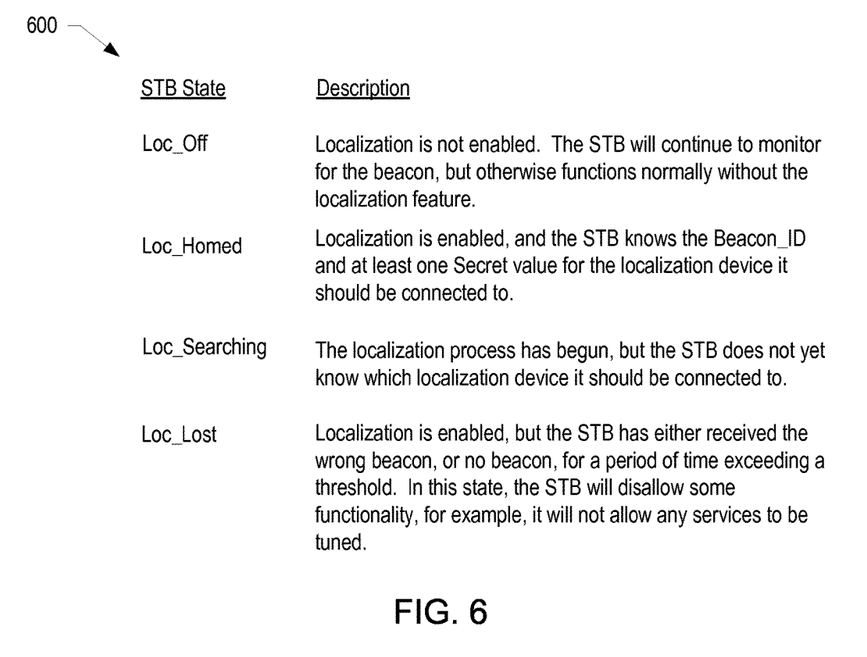
FIG. 6 is a table of four example set top box homing states.
Figure 7:
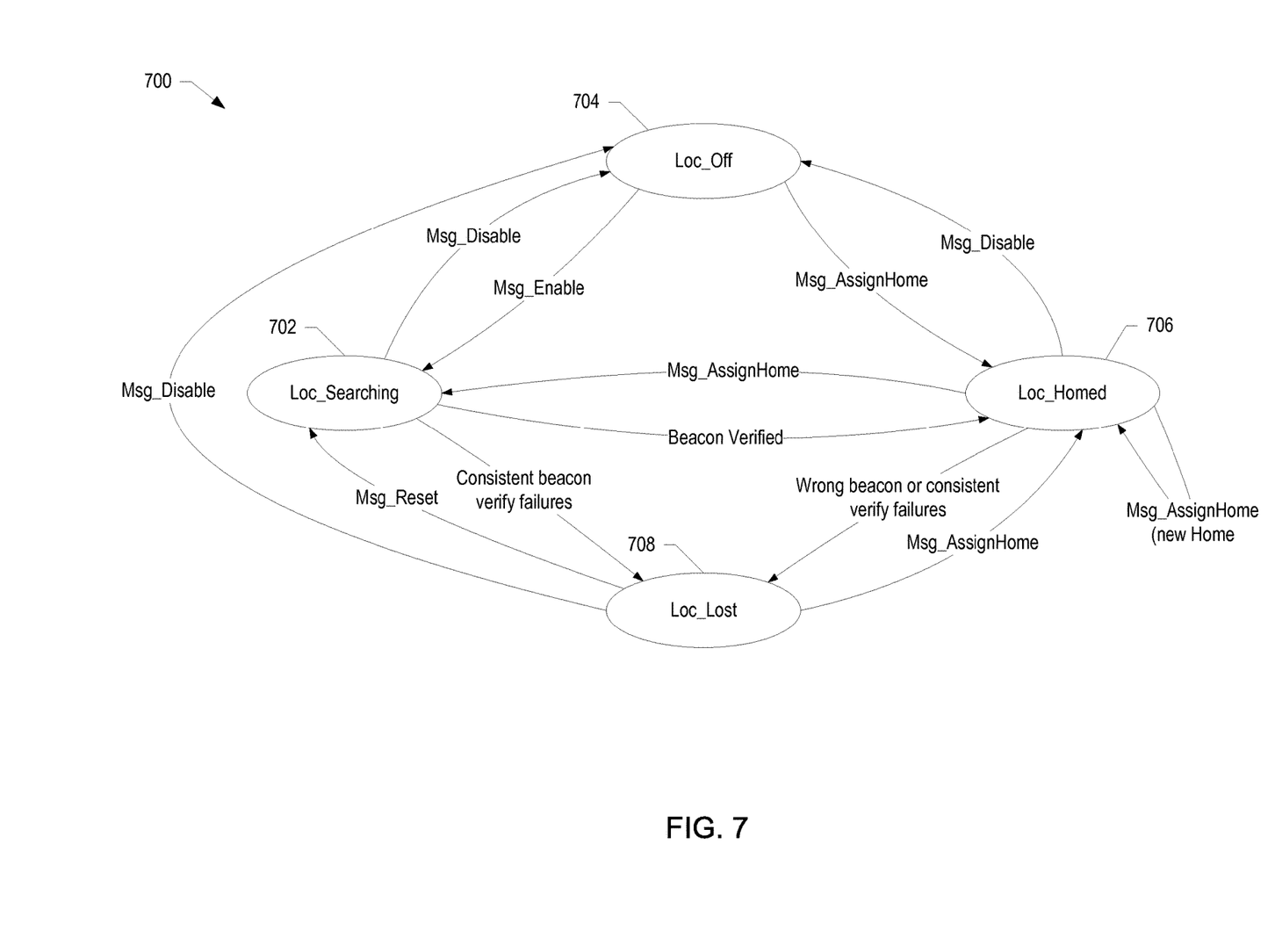
FIG. 7 is an example state diagram depicting events that cause an example set top box to move between the example set top box homing states shown in FIG. 6.

FIG. 6 is a table 600 of four example set top box homing states. In some implementations, a STB can be in one of these four states shown in the table 600. FIG. 7 is an example state diagram 700 depicting events that cause an example set top box to move between the example STB homing states shown in FIG. 6.

An example STB can be homed according to a direct homing scheme, an inferred homing scheme, or a combination of the two. Using inferred homing, a STB can be configured to home itself to a localization device whose beacon is detected at or near the time the STB is installed and powered up. Using direct homing, a STB can receive one or more instructions from a cable television head end to inform the STB which localization device it is homed to. In a combined scheme, the STB can first use inferred homing when it is installed and powered up and later instructions from a cable television head end modify the home state of the STB. For example, an instruction from the cable television head end can instruct the STB to switch from a default mode to a mode monitoring the incoming signal for a more robust (e.g., more secure) beacon type.

State transitions in FIG. 7 starting with "Msg" are messages from a cable television head end to a STB using a direct homing scheme. Transitions that do not begin with "Msg" can occur based on an inferred homing scheme. STBs can be initially configured to start in the Loc_Searching state 702 or the Loc_Off state 704. For example, a STB configured to use inferred homing at power up can have an initial state of Loc_Searching 702. From the Loc_Searching state 702 the STB can move to the Loc_Homed state 706 if a beacon is received and verified by the STB. From the Loc_Searching state 702 the STB can move to the Loc_Lost state 708 upon the STB detecting consistent failures in verifying a localization beacon. From the Loc_Searching state 702 the STB can move to the Loc_Off state 704 if a disable instruction is received from a cable television head end.

From the Loc_Off state 704 the STB can move to the Loc_Searching state 702 if an enable message is received from the cable television head end. From the Loc_Off state 704 the STB can move to the Loc_Homed state 706 if an assign home message is received from the cable television head end.

From the Loc_Homed state 706 the STB can move to the Loc_Off state 704 if a disable message is received from the cable television head end. From the Loc_Homed state 706 the STB can move out of and back to the Loc_Homed state 706 if an assign home message is received from the cable television head end and a beacon from a new localization device is received (a STB already homed to a localization device is rehomed to a different localization device). From the Loc_Homed state 706 the STB can move to the Loc_Lost state 708 if the STB receives some threshold number of incorrect beacons or detects consistent beacon verify failures. From the Loc_Homed state 706 the STB can move to the Loc_Searching state 702 if an assign home message is received from the cable television head end.

From the Loc_Lost state 708 the STB can move to the Loc_Off state 704 if a disable message is received from the cable television head end. From the Loc_Lost state 708 the STB can move to the Loc_Searching state 702 if a reset message is received from the cable television head end. From the Loc_Lost state 708 the STB can move to the Loc_Homed state 706 if an assign home message is received from the cable television head end.

Figure 8:
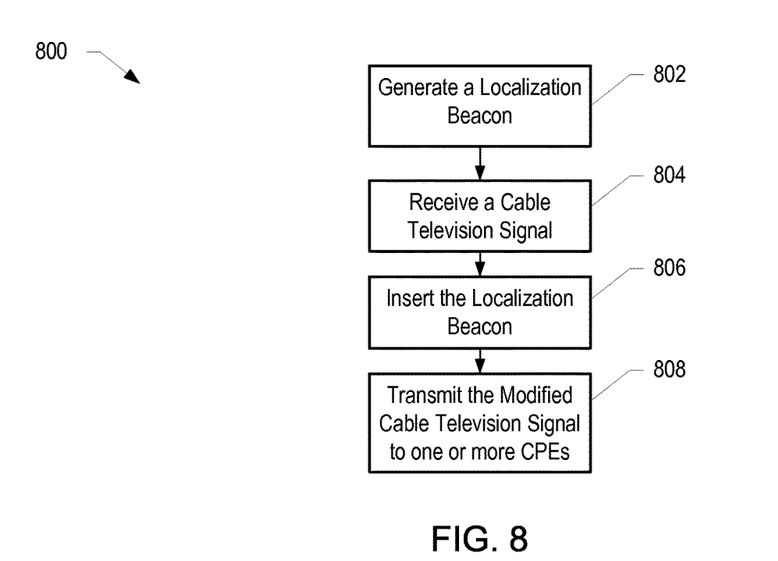
FIG. 8 is an example method of transmitting localization beacons.

FIG. 8 is an example method 800 of transmitting localization beacons. A localization beacon is generated at block 802. For example, a processor in a localization device can create a beacon using a unique device identifier that is secured using a cryptographic key and a cryptographic calculation. In some implementations, the beacon can also include timestamp and/or location coordinate content as described above.

A cable television signal is received at block 804. For example, a localization device installed between the cable television head end and an authorized subscriber's home can receive an incoming cable television signal at a coaxial input.

The localization beacon is inserted into the cable television signal at block 806. For example, the beacon can include a binary sequence. This sequence can be used to modulate the amplitude of the cable television signal.

The modified cable television signal is transmitted to one or more CPE devices at block 808. For example, the modified signal can be sent to a coaxial output of a localization device installed between the cable television head end and a subscriber's home.

Figure 9:
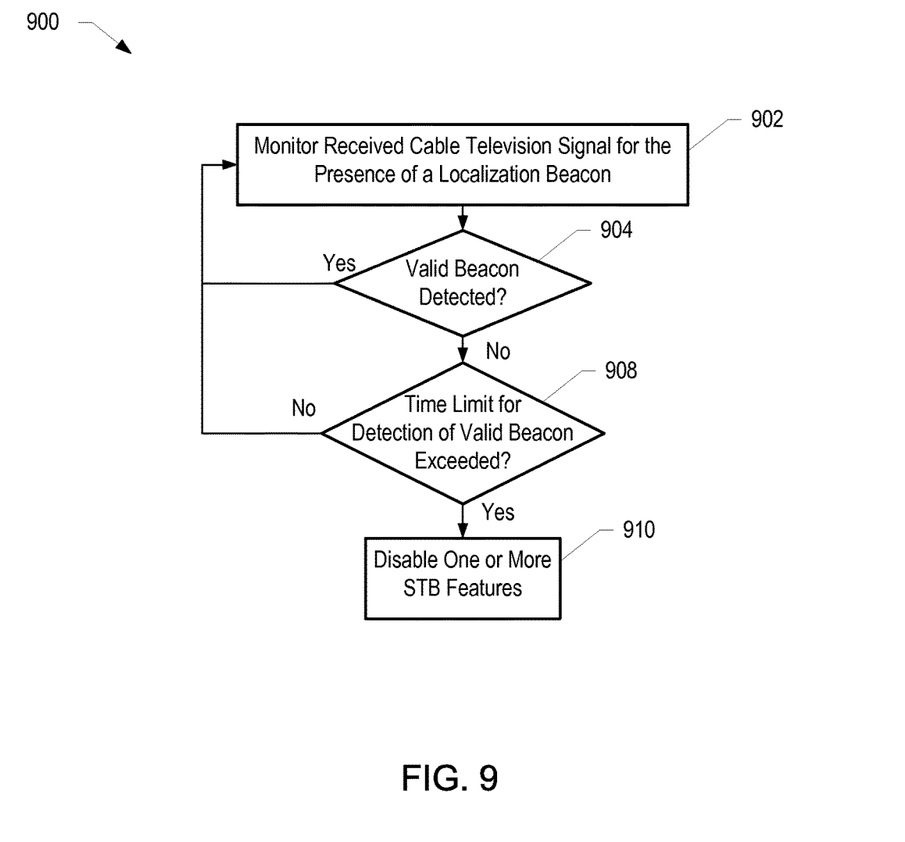
FIG. 9 is an example method of localizing a set top box to an authorized subscriber premises.

FIG. 9 is an example method 900 of localizing an STB to an authorized subscriber premises. A received cable television signal is monitored for the presence of a localization beacon at block 902. For example, a processor in a STB can be configured to monitor amplitude changes to an incoming cable television signal using feedback from an AGC.

At decision block 904, if a valid beacon is detected, the method returns to block 902 where a cable television signal continues to be monitored for future beacons. If a valid beacon is not detected, the method continues to decision block 908.

At block 908, a check is performed to determine if a time limit for receiving a valid beacon has been exceeded. If the time limit has not been exceeded, the method returns to block 902 where a cable television signal continues to be monitored for localization beacons. If the time limit has been exceeded the method continues to block 910 where one or more STB features are disabled. For example, the output of some or all television channels can be disabled.

The deployment of a localization device, as described above, along with CPE provided to subscribers at that premises that are paired to the localization device, can aid in preventing unauthorized reception of cable signals at other locations. CPE provided to an authorized receiving location are locked to that location due to the pairing of the CPE devices with the localization device inserted into the cable network branch servicing that location. Moving the CPE devices to another location renders them virtually useless. Successful use of the CPE devices at a different location requires reprogramming of the CPE devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, computers can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus configured to generate a localization beacon signal to enable or disable one or more services of a customer premise equipment paired to the apparatus, the apparatus being configured for installation proximal to or at a customer premise to serve as an intermediary device located between a head end and the customer premise equipment, the apparatus comprising:
   a first interface configured to receive content signals from a head end;
   a second interface configured to transmit content signals to one or more customer premise equipment;
   a computer readable memory;
   a first circuit configured to generate a digital sequence comprising a localization beacon based on a unique device identifier stored in the computer readable memory, the unique device identifier being associated with a specific pairing between the apparatus and one or more intended customer premise equipment (CPE) to which the apparatus is intended to be paired; and
   a second circuit configured to modulate an original signal received, at the first interface, from the head end, based on the digital sequence, and to provide a resulting modified signal to the second interface for transmission to the customer premise equipment, wherein the customer premise equipment is configured to monitor the transmitted resulting modified signal for presence of the localization beacon and to disable the one or more features of the customer premise equipment if a localization beacon corresponding to an intended pairing is not detected within the transmitted resulting modified signal within a detection time period, wherein the customer premise equipment is configured to determine a modulated digital sequence as the received localization beacon based on an adjustment of the transmitted resulting modified signal to a level for use by the customer premise equipment, and wherein a bit rate of the modulated digital sequence introduced by the second circuit is less than a maximum amount for which the customer premise equipment can compensate.

2. The apparatus of claim 1, wherein the second circuit comprises a variable forward gain stage circuit configured to modulate an amplitude of the original signal to generate the resulting modified signal.

3. The apparatus of claim 1, wherein the first circuit comprises a processor.

4. The apparatus of claim 1, wherein the original signal comprises a cable television signal.

5. The apparatus of claim 1, wherein the original signal comprises a broadband Internet signal.

6. An apparatus comprising:
a computer readable memory including data for pairing the apparatus to an intended localization device having an interface connected to a head end;
a first circuit configured to monitor, from a connected localization device, an input signal for presence of a localization beacon transmitted therefrom and to disable one or more features of the apparatus if a localization beacon corresponding to a pairing between the intended localization device and the apparatus is not detected within the input signal within a detection time period,
wherein the localization beacon associated with the intended localization device comprises a digital sequence generated based on a unique device identifier associated with the pairing between the intended localization device and the apparatus, the digital sequence having been modulated, by the intended localization device, into a signal received by the intended localization device from the head-end to form the input signal; and
a second circuit configured to determine the modulated digital sequence as the received localization beacon based on an adjustment of the received input signal to a level for use by the apparatus, wherein a bit rate of the modulated digital sequence introduced by the connected localization device is less than a maximum amount for which the second circuit can compensate.

7. The apparatus of claim 6, wherein the pairing between the intended localization device and the apparatus is established via programming of the apparatus during installation of the apparatus at a premise.

8. The apparatus of claim 6, wherein the apparatus comprises a cable set top box (STB) and the one or more device features disabled if the localization beacon corresponding to the intended localization device is not detected within a detection time period include video output corresponding to at least one cable television channel.

9. The apparatus of claim 6, wherein the apparatus comprises a cable modem including an Ethernet port for use with a local area network and the one or more device features are disabled if the localization beacon corresponding to the intended localization device is not detected within a detection time period include Ethernet port output.

10. The apparatus of claim 6, wherein the second circuit comprises an automatic gain control (AGC), and wherein the digital sequence associated with the localization beacon is inserted into a higher bit rate digital signal through amplitude modulation.

11. The apparatus of claim 6, wherein the first circuit is configured to store the pairing data in the computer readable memory after an initial receipt of a localization beacon.

12. The apparatus of claim 6, wherein the computer readable memory includes one or more cryptographic keys, and wherein the first circuit is configured to decrypt data included in the localization beacon using at least one cryptographic key.

13. The apparatus of claim 6, wherein the apparatus is installed at an authorized receiving location downstream from the connected localization device.

14. The apparatus of claim 6, wherein the received modulated digital sequence comprises two or more localization beacons, each associated with the apparatus to which the intended localization device is intended to be paired.

15. The apparatus of claim 6, wherein the received modulated digital sequence comprises two or more sequential localization beacons, each associated with the apparatus to which the intended localization device is intended to be paired.

16. The apparatus of claim 6, wherein the received modulated digital sequence comprises two or more interleaved localization beacons, each associated with the apparatus to which the intended localization device is intended to be paired.

17. The apparatus of claim 6, wherein the received modulated digital sequence comprises a first localization beacon and a second localization beacon, the first localization beacon being based on a first cryptographic key, and the second localization beacon being based on a second cryptographic key, each of the first and second cryptographic key being associated with the apparatus to which the intended localization device is intended to be paired.

18. The apparatus of claim 6, wherein the received modulated digital sequence comprises a first localization beacon and a second localization beacon, the first localization beacon including a unique device identifier, and the second localization beacon including a digital certificate for authentication of the first localization beacon.

19. A method of operating a customer premise device (CPE) for use with a localization device comprising:
monitoring, from a connected localization device, an input signal for presence of a localization beacon transmitted therefrom,
wherein the localization beacon associated with the intended localization device comprises a digital sequence generated based on a unique device identifier associated with the pairing between the intended localization device and the apparatus, the digital sequence having been modulated, by the intended localization device, into a signal received by the intended localization device from the head-end to form the input signal, and
wherein the modulated digital sequence is demodulated, via a circuit, based on an adjustment of the received input signal to a level for use by the customer premise device, and wherein a bit rate of the modulated digital sequence introduced by the connected localization device is less than a maximum amount for which the circuit can compensate; and upon determining that a localization beacon corresponding to a pairing between an intended localization device and the apparatus is not detected within the input signal within a detection time period from the monitored input signal, disabling one or more features of the customer premise device.

20. The method of claim 18, wherein the customer premise device is selected from the group consisting of i) a cable modem configured to provide, from the input signal, Ethernet packets and ii) a set top box configured to generate, from the input signal, a video output corresponding to at least one cable television channel.

\* \* \* \* \*